(12) United States Patent
Moisel

(10) Patent No.: US 7,132,654 B2
(45) Date of Patent: Nov. 7, 2006

(54) DEVICE FOR IMPROVING VIEW IN A VEHICLE

(75) Inventor: Joerg Moisel, Neu-Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 339 days.

(21) Appl. No.: 10/811,627

(22) Filed: Mar. 29, 2004

(65) Prior Publication Data

US 2004/0195508 A1 Oct. 7, 2004

(30) Foreign Application Priority Data

Apr. 4, 2003 (DE) .................... 103 15 741

(51) Int. Cl.
*G01J 5/00* (2006.01)
(52) U.S. Cl. .................. 250/330; 250/339.05
(58) Field of Classification Search ............... 250/330, 250/332, 339.05
See application file for complete search history.

(56) References Cited

U.S. PATENT DOCUMENTS

| | | | | |
|---|---|---|---|---|
| 6,150,930 A | * | 11/2000 | Cooper | 340/435 |
| 6,966,681 B1 | * | 11/2005 | Stephan et al. | 362/464 |
| 2002/0001198 A1 | * | 1/2002 | Eschler et al. | 362/510 |
| 2003/0076688 A1 | * | 4/2003 | Kobayashi | 362/510 |
| 2003/0107323 A1 | * | 6/2003 | Stam | 315/82 |
| 2005/0023465 A1 | * | 2/2005 | Eggers et al. | 250/330 |

FOREIGN PATENT DOCUMENTS

| | | |
|---|---|---|
| DE | 41 07 850 A1 | 6/1992 |
| DE | 41 37 551 A1 | 3/1993 |
| DE | 43 35 244 A1 | 6/1995 |
| WO | WO 2004005868 A2 * | 1/2004 |
| WO | WO 2005066684 A1 * | 7/2005 |

* cited by examiner

*Primary Examiner*—Albert Gagliardi
(74) *Attorney, Agent, or Firm*—Akerman Senterfitt; Stephan A. Pendorf; Yonghong Chen

(57) ABSTRACT

A device for improving the view in a motor vehicle. It includes with a radiation source for illumination of the vehicle environment with infrared radiation, an infrared sensitive camera for detecting at least a part of the illuminated vehicle environment and a display for presenting the image information detected by the camera. In accordance with the invention, the camera is provided with an IR-filter which exhibits areas of differing transmission characteristics. The IR-filter thereby exhibits at least one area with a degree of transmission of approximately 70% for visible light or parts thereof and preferably at least a second area with a degree of transmission of approximately or less than $10^{-5}$ for visible light. By this design of the device for improving the view in a motor vehicle it is made possible to provide a reliable detection if the vehicle environment and thereby to more reliably map out the road traffic.

9 Claims, 4 Drawing Sheets

DEVICE FOR IMPROVING VIEW IN A VEHICLE

BACKGROUND OF THE INVENTION

1. Field of Invention

The invention concerns a device for improving the view in a motor vehicle according to the precharacterizing portion of Patent Claim 1.

2. Related Art of the Invention

Devices of this type are known from DE 41 07 850 A1 and from DE 41 37 551 A1. Therein there is shown an emission source for illuminating the vehicle environment with infrared radiation, an infrared sensitive camera for detecting at least a portion of the illuminated vehicle environment and a display for depicting the image information detected by the camera. In addition, the infrared sensitive camera is provided with an IR-filter, which is transparent to the infrared radiation of the radiation source, while being non-transparent for the remainder of the infrared emission spectrum as well as visible light due to its high blocking effect. Thereby it is accomplished that daylight as well as normal light from headlights of oncoming vehicles is completely blocked or very strongly attenuated and the interference with or disruption of the detected image information due to this extraneous light is substantially precluded.

One IR-filter of this type is available for example from the company LINOS PHOTONICS as product RG 780. It exhibits in the infrared radiation range, that is, at a wavelength of greater than 780 nm, a degree of transmission of approximately 98%, in comparison to which in the range of the visible light it exhibits a typical degree of transmission of approximately $10^{-5}$. From DE 41 37 551 A1 it is known to use an IR-filter variable in the degree of transmission in the infrared radiation range over its surface, in comparison to which the visible light is completely attenuated.

SUMMARY OF THE INVENTION

The present invention is concerned with the task of providing a device for improving the visibility in a motor vehicle according to the precharacterizing portion of Patent Claim 1, which in simple manner makes possible a recognition of traffic lights, brake lights and turn signals of other traffic participants in a sufficiently reliable manner.

This task is solved by a device for improving the view in a motor vehicle having the characterizing features of Patent Claim 1.

Advantageous further developments of the invention are the subject of the dependent claims.

The inventive device for improving the view in a vehicle includes an IR-filter, which is associated with the infrared sensitive camera and which is subdivided into spatial areas, and exhibits different transmission characteristics in these areas. As a result of these different transmission characteristics it is accomplished that there is at least one area exhibiting the typical IR-filter blocking effect for light outside the infrared radiation range and, in comparison thereto, in the frequency range of the IR-radiation, exhibiting a high degree of transmission, in the realm of 100%. In an appropriate manner there also exists at least one separate spatial area of the filter, which differs in the transmission characteristics to the extent that it does not have this specific blocking effect regarding visible light, as exhibited by the at least one other area of the IR-filter.

It has been found particularly useful to provide the spatial area of the IR-filter with a lower blocking effect for the visible light with a degree of transmission of approximately or greater than $10^{-3}$, in comparison to which the preferred degree of transmission for the visible light of the second, other area with high blocking effect is selected to be in the range of $10^{-5}$ or smaller. By this differentiated structuring of the one single IR-filter it becomes possible to provide a very simple device for improving the visibility in a vehicle, which makes it possible to detect and to provide as useful information to the vehicle operator essential information from the environment of the vehicle, such as for example turn signals or brake lights of preceding vehicles or traffic signals or in certain cases other non-active self-lighted traffic signs. By this design and use of the spatially differentiated organized IR-filter it becomes possible to provide for the use of the operator in simple and reliable manner essential information for the safe guidance of the vehicle. Thereby it is achieved that the risk of an accident is substantially reduced.

Therein, the at least one area which is not so strongly blocking for visible light or parts thereof, as is the typical IR-filter, which has a degree of transmission of greater than $10^{-3}$ or in the range of $10^{-3}$, is made almost completely transparent. As a result, the degree of transmission for this area is in the range of 100%, for example 60 or 70%. This can be realized in particular therein, that the inventive IR-filter includes a hole or, as the case may be, a cutout or clearance or open area in the coating of the IR-filter, which brings about a substantial increase in the degree of transmission for visible light or the part of the visible light, in particular up to the range of 100%. By this design of the IR-filter with a clearance or cutout, a very simple and economical filter is provided for the inventive device for improving the view in a motor vehicle.

As radiation source for illuminating the vehicle environment with infrared radiation, vehicle headlights using halogen light sources, infrared LED-radiation sources or even infrared laser emission sources have proven themselves to be reliable. The infrared radiation sources or, as the case may be, the infrared laser radiation sources, exhibit an emission spectrum with very narrow width in the IR-radiation range, and make it possible thereby to dispense with supplemental IR-filters in the range of the emission light source. These IR-filters, employed for example in the case of halogen lights which emit visible light and IR-radiation, are provided to prevent the emission of visible light in addition to the light from the additionally present vehicle headlights, and thereby to provide a clear and distinct illumination situation in the environment. This makes possible a particularly effective detection and evaluation of the detected image information by the infrared sensitive camera.

The infrared sensitive camera is preferably a CCD- or CMOS-camera. Preferred CMOS-cameras have a nonlinear logarithmic sensitivity curve, which substantially facilitates the image evaluation of the image data downstream of the camera with extreme dynamic range. CCD-cameras are very compact, robust and economical.

The image information acquired by the infrared sensitive camera is subjected to image processing, which includes at least a formatting to conform to the display. Beyond this, there is possible in particular functionalities, such as conforming the dynamic range, selecting certain image information, accentuating certain image information, classifying the acquired image information or even only color corrections or light intensity corrections by the subsequent image processing. The image information acquired by the infrared sensitive camera is, following image processing, provided to the display, which is typically in the form of a flat TFT or LCD display or a heads up display, in order to provide this information in the field of view of the driver.

The IR-filter used herein is preferably a glass filter, which as a result of its glass composition or, as the case may be, due to its coating, exhibits the desired filter characteristics, in particular its spatially differentiated transmission characteristics. This filter is preferably a round filter mounted directly on the lens of the infrared sensitive camera, where it is seated upon, screwed on or secured via a bayonet connection with the camera lens. Beyond this, other embodiments of a single IR-filter are possible, which is provided to the infrared sensitive camera, such that it is positioned in the light entry path for the environment acquired by the infrared sensitive camera. By the use of the precisely one filter, a very simple, robust assembly comprised of filter and camera is provided in a device for improving the view in a vehicle.

It has been found particularly advantageous to provide the one or more areas having the higher degree of transmission for visible light or parts thereof in the edge areas, this design being associated with simplified manufacturing. This leads to an economical and specific IR-filter to be manufactured with the desired characteristics. In particular, the total filter characteristics can be particularly specifically designed by the selection of the size of the one or more mentioned areas in the edge area of the filter.

Alternatively thereto, it has been found useful to provide the area with the relatively high degree of transmission for visible light or parts thereof in the central area of the filter, since precisely in this area the optical image or reproduction characteristics are particularly good and the desired supplemental image information, which is transmitted as visible light, for example illuminated signs such as traffic lights, brake lights, turn signals, etc. having particular safety relevant functions or, as the case may be, meaning for the driver, can be easily detected or recognized. By the arrangement of the one or more areas in the central area of the IR-filter it has been found advantageous that a clear representation and therewith reliable detection of the safety relevant information by the driver is made possible, and thereby the traffic safety can be increased.

It has been found particularly advantageous to design the area of the IR-filter or as the case may be the areas of the IR-filter in such a manner that its surface area or the sum of its surface areas typically comprises not more than 25% of the surface area of the IR-filter which is provided in the beam path of the detection area of the infrared sensitive camera. Preferably, the surface area of the area or, as the case may be, the sum of the surfaces of the areas, are selected to be not less than 1% of the above mentioned surface area of the IR-filter, so that on the one hand a sufficient attenuation of the interfering light sources and therewith a reliable and simple image processing for representation of the detected image information is made possible. A glaring and in certain cases a blinding of the user by the headlights of oncoming vehicles is therewith substantially precluded. Nevertheless it is sufficiently ensured that a sufficient amount of image information is detected as visible light, so that the reproduction of traffic signs such as traffic lights or vehicle signals such as turn signals are ensured in sufficient measure. This maximal or, as the case may be, minimal surface area relationship between areas of strong attenuation of the visible light or, as the case may be, with a degree of transmission of less than or substantially less than $10^{-5}$, and the areas of weak or only very minimal attenuation of the visible light, for example with a degree of transmission of $10^{-2}$ or in the vicinity of 60%, provides a very effective and reliable device for improving the view in a vehicle.

It has been found particularly advantageous when at least one area of the IR-filter is designed with less attenuation of visible light or, as the case may be, parts of the visible light, in the form of a star (in particular a three or five pronged star), a circle, a square, an arc or a segment of circle or a ring. These designs of the areas can by simply and reliably produced with existing manufacturing processes, and therewith provide the desired optical characteristics of the filter in order to achieve therewith the best possible effect of the IR-filter in a device for improving the view in a motor vehicle. Therein it has been found particularly desirable to use the shape of a circle in the provision of the area in the central area of the IR-filter, in comparison to which it has been found particularly desirable to provide the shape of a ring in the case that the positioning of the area is in the edge area or, as the case may be, the shape of a segment of a circle, likewise in the edge area of the IR-filter. These shapes can be produced in extraordinarily simple and reliable manner using known manufacturing techniques. For example, the coating can, at the edge area of the IR-filter, for example a round IR-filter, be removed up to a certain distance from the edge, or even not applied, so that in simple manner a ring-shaped form of the area with increased transitivity for visible light or parts thereof is produced.

The invention is not limited to the above-described explicit embodiments of the invention, but rather, simple deviations of the explicitly described embodiments of the inventive device for improving the view in the motor vehicle are also encompassed by the invention.

BRIEF DESCRIPTION OF THE DRAWING

In the following the invention will be described in greater detail on the basis of an example of an embodiment of a device for improving the view in a motor vehicle or, as the case may be, a IR-filter therefore.

DETAILED DESCRIPTION OF THE INVENTION

Figure 1:
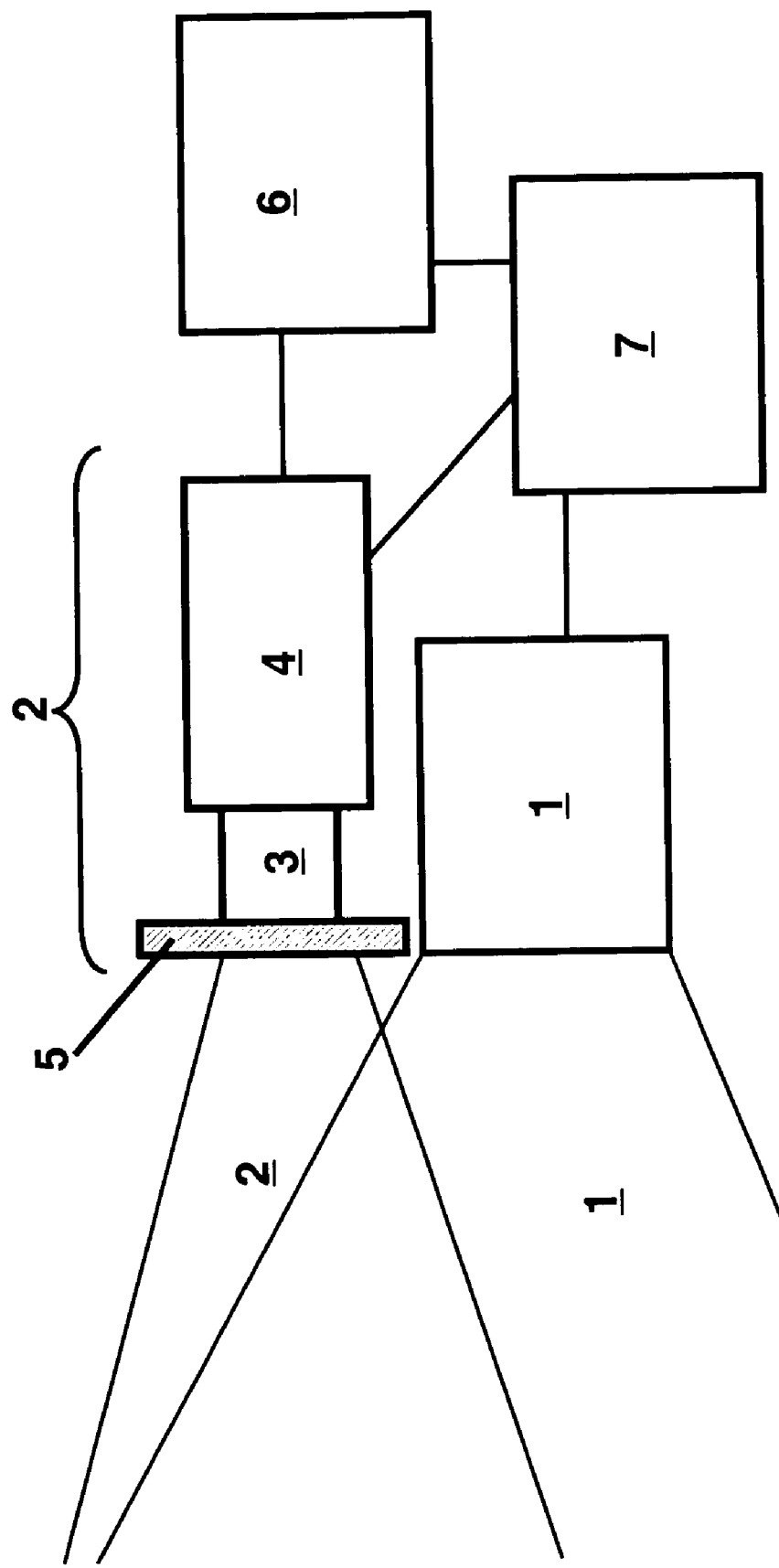
FIG. 1 shows a schematic design of an exemplary inventive device for improving the view in a motor vehicle.

FIG. 1 shows, in schematic representation the cooperation between the design of an inventive device for improving the view in a motor vehicle.

With an infrared radiation source 1, which in this embodiment is an infrared LED headlight, the vehicle environment is illuminated with infrared radiation. The area 1a illuminated with infrared radiation is at least partially acquired by the infrared sensitive camera 2. The acquisition area of the infrared radiation sensitive camera 2a is here not coextensive with the illumination area 1a of the infrared radiation source 1. Those elements of the environment illuminated by the radiation source 1 which are located in the detection area 2a of the camera 2, as well as elements, which are not in the illuminated area but are however are in the detection area of the camera 2a, are detected by the infrared sensitive camera 1. This detection occurs via the lens 3 and the image processing unit 4 in the camera.

Beyond this, the lens 3 is provided with an IR-filter 5, which includes areas, which are very strongly damping or attenuated for visible light in the manner of a conventional IR-filter, and is also provided with areas which in contrast thereto are, in accordance with the invention, only slightly attenuated. Accordingly the lens 3 an the image processing unit 4 of the camera 2 si supplied not only with image signals which are transmitted by means of infrared radiation, but rather beyond this also image signals of significant strength, which are transmitted by visible light. By the provision of these two types of image information it is ensured that both the elements of the environment illuminated with IR-radiation, that is, irradiated for their part by the IR-radiation source 1, as well as also the passively illuminated, for example, thermal radiation emitting elements, are reliably detected on the base of their IR-emissions and can be displayed, as well as the elements which emit visible light of sufficient intensity. A complete suppression of the visible light, as is the state of the art, is neither desired nor achieved according to the present invention.

Thereby it becomes possible to reliably detect for example brake lights or turn signals of preceding vehicles, green traffic lights, or also a blue light from emergency vehicles using the camera 2 with the IR-filter 5, the lens 3 and the image processing unit 4, and to reliably present in the display 6 associated with the camera 2 the image information transmitted and detected on the basis of visible light as well as image information transmitted and detected on the basis of infrared radiation, and to provide this information for the use of the vehicle operator.

The radiation source 1, the camera 2 and the display 6 are connected with a control unit 7 of the device for improving the view in a motor vehicle, which switches the individual components of the device on or off in targeted or precise manner or, as the case may be, controls them. Thereby the control is so carried out, that a danger to the environment, for example by the illumination by means of the infrared radiation source, is substantially precluded.

Figure 2:
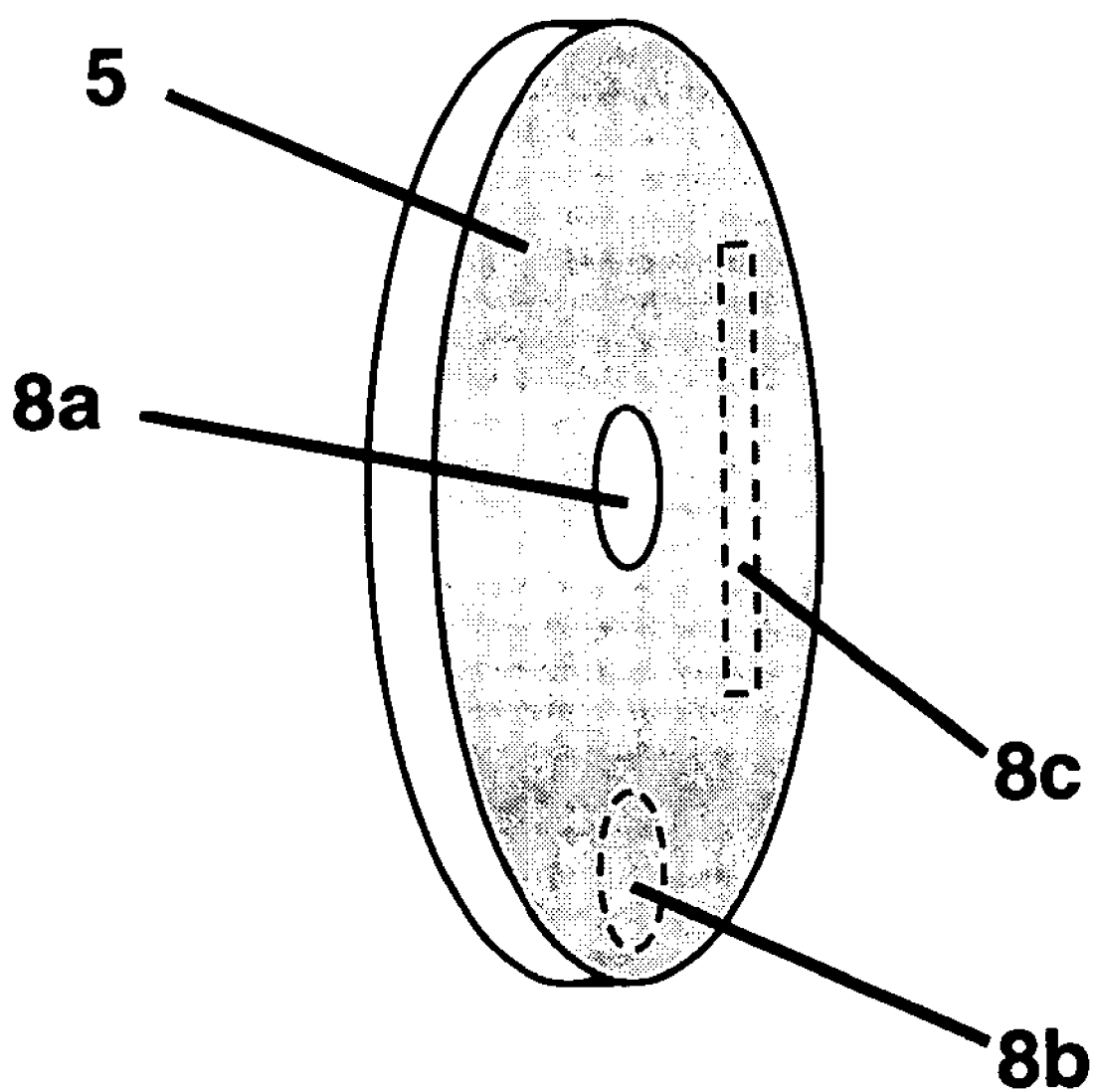
FIG. 2 shows an exemplary embodiment of an IR-filter.

In FIG. 2 an exemplary embodiment of the IR-filter is shown. The filter is in the form of a disk, which over its entire surface exhibits a degree of transmission of significantly less than $10^{-4}$ for visible light, in comparison to which the transmission for infrared radiation is significantly greater, in particular in the realm of 100%. This transmission characteristic does not exist in three areas: 8a, 8b, 8c. In these areas 8a, 8b, 8c the degree of transmission for the major portion of the visible light is significantly increased and lies in the range of $10^{-2}$. The area 8a is in the center of the central area of the circular or, as the case may be, disk shaped filter 5. By the circular shaped design of the area 8a in the central area it is ensured that an optically reliable, in particular true-to-shape representation or, as the case may be, optical image of the objects in the detection area 2a, which emit or reflect visible light, is ensured, so that the camera 2 can very easily and reliably detect these objects and provide them for reproduction on the display 6.

The design of a circular shaped cutout corresponding to the area 8a in the central area of the IR-filter 5 has the effect of a wavelength selective iris, which makes it possible to provide a very good image transmission characteristic in the visible range, corresponding to smaller lens apertures, which makes it possible, in an achromatic lens of the infrared light sensitive camera, to dispense in particular with the correction of the visible light. The circular shaped area 8a has the effect of a lens aperture, which on the basis of its low diameter produces an increased focal length. Therein the diameter is selected to be smaller, the larger the degree of transmission of the area for the visible light or parts thereof. Thereby it is possible to provide an economical simple design of the device for improving the view in a motor vehicle. The rest of the IR-filter area, which covers the main part of the IR-filter 5, does not exhibit this special aperture effect, as a result of which the lens of the IR-camera need not specially be design-optimized for the visible light but rather on the infrared rays, which again leads to a cost reduction of the infrared light sensitive camera relative to a conventional camera which is suitable for both infrared radiation as well as for visible light and shows a very good image forming ability in both frequency ranges.

By the design of the supplemental areas 8b, 8c in the edge area of the edge of the disk shaped IR-filter, once in circular shape 8b and once in quadrilateral shaped 8c, it is accomplished that the total surface area of the areas 8a, 8b, 8c cover a noticeable part of the total effective filter surface of the IR-filter 5 and thereby a sufficient and reliable reproduction of turn signals, traffic lights and the like is ensured and it is further ensured that these are not suppressed by the blocking effect of the rest of the IR-filter. The total surface of the areas 8a, 8b, 8c corresponds to approximately 15% relative to the total surface area of the IR-filter. The areas 8b, 8c can be produced very simply with conventional manufacturing technology, in that beginning from the edge of these areas 8b, 8c of the IR-filter 5 in their surface area characteristics are changed and thereby the degree of transmission for essential parts of the visible light, for example, in the green, are substantially increased. This change of the surface characteristic is produced by the subsequent removal of the filer active surface coating.

Figure 3:
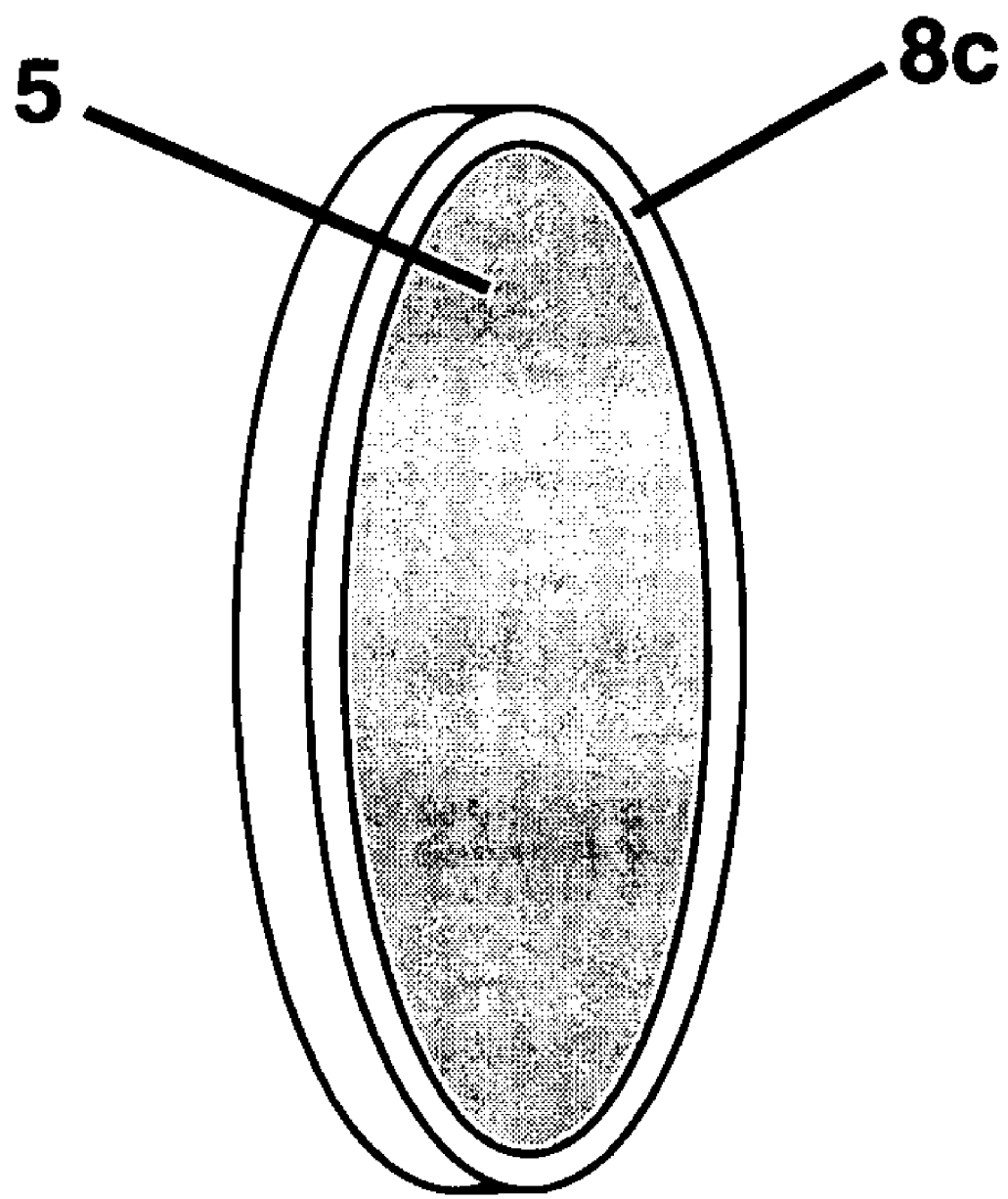
FIG. 3 shows a different exemplary embodiment of an IR-filter.

In FIG. 3 an alternative embodiment of the filter 5 is shown. The edge area 8d of the IR-filter 5 is in the form of ring-shaped area, which is more transmissive for visible light than the central area of the filter 5, which has a blocking effect for visible light, that means, has a degree of transmission of significantly less than $10^{-5}$. The ring-shaped area 8d is achieved thereby, that the surface coating of the filter 5 is removed in the edge area and thereby a transmissive area for visible light is provided with a degree of transmissivity of approximately 70%. By this design an easily produced IR-filter 5 with particular characteristics is provided, which makes possible in a device according to FIG. 1 a positive and reliable representation of the infrared illuminated environment, without there being a complete suppression of the remaining self-illuminated elements in the environment, which could be of significance for the driver of the vehicle. This is accomplished by the formation of the ring shaped areas 8d in the edge area of the filter 5 with simple manufacturing technical means. The need for complicated or supplemental technical provisions can thereby by substantially dispensed with.

Figure 4:
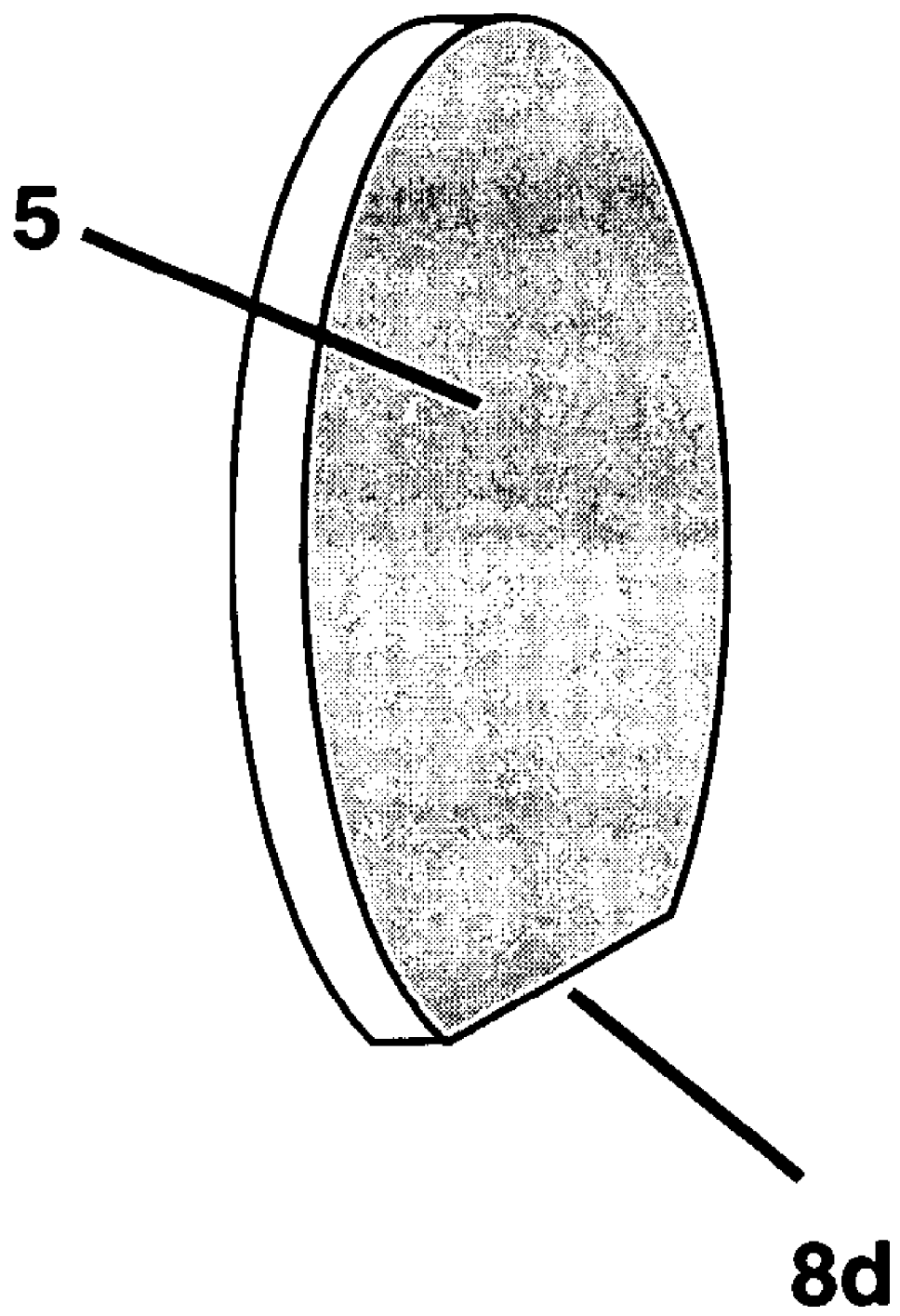
FIG. 4 shows a further embodiment of an exemplary IR-filter for an inventive device for improving the view in a motor vehicle.

An embodiment of the inventive IR-filter which is simple to manufacture and effective for an inventive device for improving the view in a motor vehicle is shown in FIG. 4. A disk-shaped IR-filter 5 with a typical transmission curve is ground away at its edge areas such that a segment of a circle 8a of the disk shaped filter is removed. As a result, the visible light can pass through unimpeded in the direction of the lens of the camera and be detected by the camera 2. Thereby it is ensured that, in a very simple and economical manner, visible light is detected and important traffic information in the visible light range is not filtered away.

The invention claimed is:

1. A device for improving the view in a motor vehicle, comprising
   a radiation source for illumination of the vehicle environment with infrared radiation, an infrared sensitive camera for detecting at least a part of the illuminated vehicle environment, an IR-filter associated with the camera and disposed in front of the camera, and a display for representing the image information acquired by the camera, wherein different areas of the IR-filter area exhibit different transmission characteristics, and wherein at least one area of the IR-filter is almost transparent for visible light or a part thereof.

2. The device according to claim 1, wherein said at least one area has a degree of transmission of approximately $10^{-3}$ or greater for visible light or pans thereof.

3. The device according to claim 2, wherein said at least one area is located at the edge area of the IR-filter.

4. The device according to claim 2, wherein said at least one area is provided in the central area of the IR-filter.

5. The device according to claim 2, wherein the at least one area of the IR-filter comprises less than 25% of the surface of the IR-filter.

6. The device according to claim 2, wherein said at least one area of die IR-filter is in the shape of a circle, a star, a quadrilateral, a circle segment, a section of a circle or a ring.

7. The device according to claim 2, wherein said at least one area of the IR-filter is formed by one of; a hole in the IR-filter, a clear area in the coating of the IR-filter, and an open area in the coating of the IR-filter.

8. The device according to claim 1, wherein the IR-filter exhibits at least a second area with a degree of transmissivity of approximately $10^{-5}$ or less for visible light.

9. The device according to claim 1, wherein said IR-filter is transmissive for infrared radiation emitted by said radiation source.

* * * * *